UNITED STATES PATENT OFFICE.

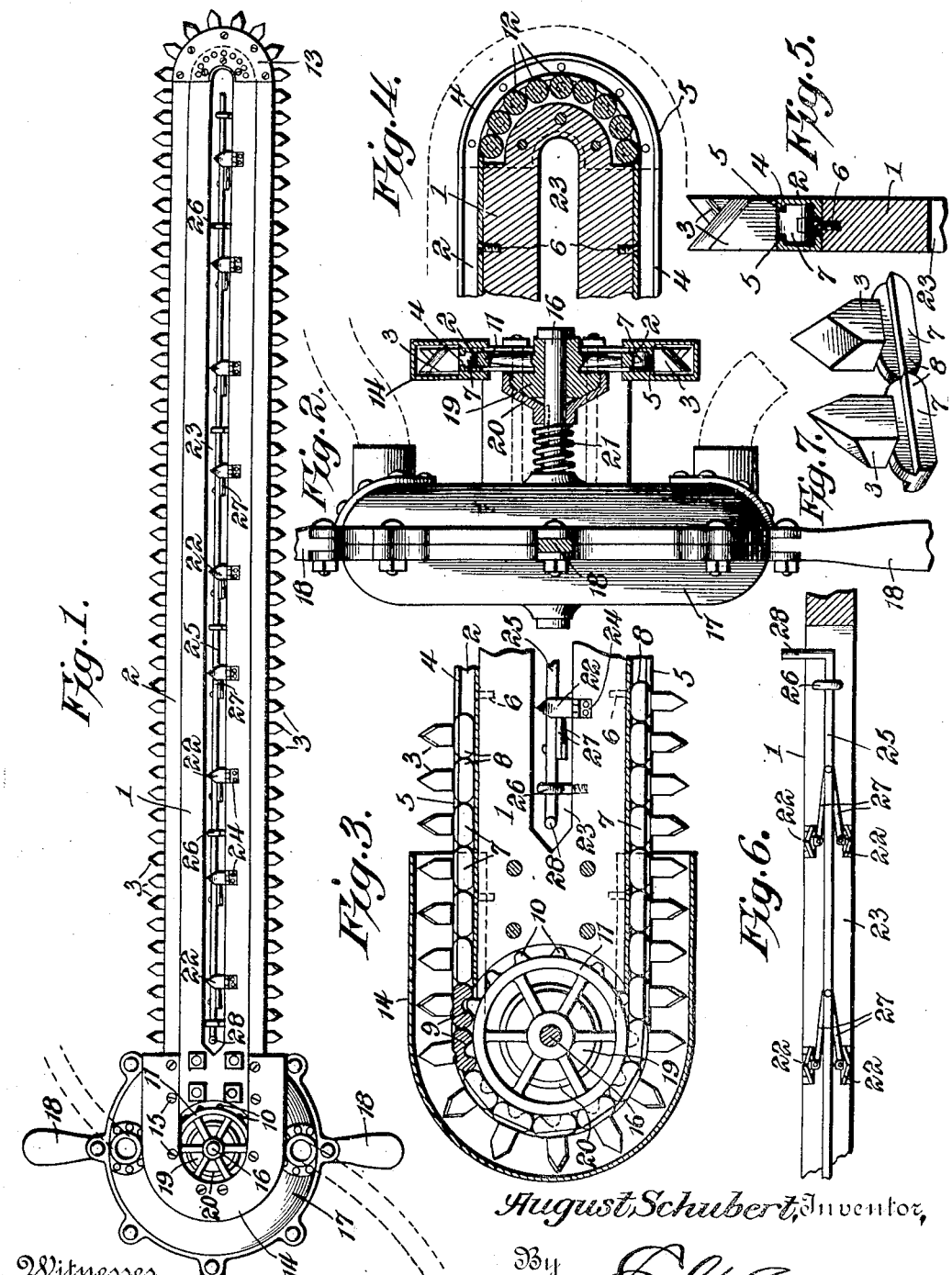

AUGUST SCHUBERT, OF SNOHOMISH, WASHINGTON.

PORTABLE CROSSCUT-SAW.

No. 869,659.  Specification of Letters Patent.  Patented Oct. 29, 1907.

Application filed July 19, 1904. Serial No. 217,259.

*To all whom it may concern:*

Be it known that AUGUST SCHUBERT, a citizen of the United States, residing at Snohomish, in the county of Snohomish and State of Washington, has invented a new and useful Portable Crosscut-Saw, of which the following is a specification.

The invention relates to a portable cross cut saw.

The object of the present invention is to improve the construction of saws, and to provide a simple, inexpensive and efficient motor-actuated cross cut saw designed particularly for clearing land, and adapted to be easily handled, and capable of rapidly cutting down trees, cross cutting logs, and the like.

With these and other objects in view, the invention consists in the construction and novel combination and arrangement of parts, hereinafter fully described, illustrated in the accompanying drawing, and pointed out in the claims hereto appended, it being understood that various changes in the form, proportion, size, and minor details of construction, within the scope of the claims, may be resorted to without departing from the spirit or sacrificing any of the advantages of the invention.

In the drawing:—Figure 1 is a plan view of a portable cross cut saw, constructed in accordance with this invention. Fig. 2 is an end elevation partly in section. Fig. 3 is an enlarged longitudinal sectional view of one end of the saw. Fig. 4 is a similar view of the other end of the saw, the teeth being omitted. Fig. 5 is an enlarged detail sectional view, illustrating the construction of the saw teeth and the guide for the same. Fig. 6 is a detail view, illustrating the arrangement of the hinged teeth or blades and the means for operating the same. Fig. 7 is an enlarged detail plan view, illustrating the arrangement of the cutting edges of the saw teeth.

Like numerals of reference designate corresponding parts in all the figures of the drawing.

1 designates a frame or stock consisting of a substantially oblong metal bar and forming the blade of the saw and provided with an endless guide or way 2 for the reception of saw teeth 3 of an endless cutter or saw chain. The guide or way 2, which consists of parallel side portions and curved connecting end portions, is substantially rectangular in cross section, as clearly shown in Fig. 5 of the drawing, and is provided with a longitudinal slot 4, the sides of the guide or way having inwardly-extending side flanges 5 for engaging the teeth to retain the same in the way. The endless guide, which is located at the edges of the stock or frame, may be secured to the same by screws 6, as illustrated in Fig. 5 of the drawing, or it may be mounted on or applied to the stock or frame in any other desired manner.

The teeth 3 are approximately T-shaped, being provided at their inner ends with heads 7, projecting laterally beyond the plane of the shanks of the teeth and extending beneath the overhanging side flanges 5, as clearly shown in Fig. 5. The stock or frame lies within the lateral planes of the chain saw so as to travel in the kerf. The outer ends or cutting portions of the teeth are tapered and beveled, the beveled faces being alternately arranged at opposite sides of the saw, but the cutting portions of the teeth may be of any desired form, as will be readily understood. The heads, which are slightly oblong in side elevation, are rounded at their ends at 8, and are provided on their inner faces with sockets 9, for the reception of teeth 10, of a sprocket wheel 11, which is located at one end of the saw for actuating the endless cutter formed by the independent teeth. The sprocket wheel engages the teeth at one end of the saw, and by moving the same along the endless guide actuates the endless cutter, as will be readily understood. The curved connecting portions of the endless guide or way are open at the bottom to permit the sprocket wheel 11 to mesh with the teeth, and a curved series of anti-friction rollers 12 are located at the bottom opening of the other curved connecting portion, as clearly shown in Fig. 4 of the drawing, for enabling the teeth to pass around the outer end of the saw with a minimum amount of friction. There is comparatively little friction at the parallel longitudinal side portions of the endless guide or way, and the sprocket wheel positively carries the teeth around the inner end of the saw, while the anti-friction devices at the outer end of the saw enable the teeth to move around the same with but little friction. The anti-friction devices 12 may be journaled in suitable bearings of removable approximately semi-circular end plates 13, as indicated in Figs. 1 and 4 of the drawing, but any other suitable means may be employed. The saw is provided at its inner end with an approximately U-shaped guard 14, suitably secured by screws 15, or other suitable fastening devices to the saw, and adapted to prevent the teeth from coming in contact with the operator.

The sprocket wheel is mounted on a transverse motor shaft 16, which extends from a motor 17, located at the inner end of the saw, and provided with projecting handles 18, by means of which the saw is held. Any desired form of motor may be employed for actuating the shaft 16, and as the specific construction thereof does not constitute a portion of the present invention, a detail description and illustration thereof is deemed unnecessary. A suitable clutch is provided for preventing the saw from breaking, should the teeth become stuck. The sprocket wheel, which is loosely arranged on the motor shaft, is provided with one member 19 of the clutch, and the other member 20, which is slidable on the motor shaft, frictionally engages the member 19, whereby the sprocket wheel is caused to rotate with the motor shaft. The clutch members are maintained in engagement with each other by a coiled spring 21, and should the resistance overcome the force of the spring, the motor will rotate independently of the sprocket wheel, as will be readily understood. The slidable member of the clutch is connected with the motor shaft 16 by a key and key-way, or other suitable means. Any other form of clutch may be employed for this purpose.

In order to hold the cross cut saw in the kerf, and to prevent it from tilting out of the same, the saw is provided with a series of hinged blades or teeth 22, arranged at the side faces of the stock or frame at a longitudinal slot or opening 23, and adapted to be swung inward and outward to cause them to lie either within the longitudinal opening or to project beyond the plane of the side faces of the stock or frame for engaging the walls of the kerf. The teeth or blades 22 have tapered engaging ends, and are provided at their other ends with hinged leaves or sections 24, which are suitably secured to the stock or frame, but the blades or teeth may be hingedly mounted on the saw in any other desired manner. They are designed to extend outward at an angle away from the cutting edge of the saw so as to prevent the saw from falling out of a cut, and also to permit the saw to feed inwardly. The hinged blades are controlled by a longitudinally movable operating rod 25, mounted in suitable guides 26, and connected by opposite links 27 with the hinged blades. The links diverge from the operating rod, as clearly shown in Fig. 6, and they are pivotally connected with the rod and with the blades, whereby, when the rod is moved longitudinally towards the outer end of the saw, the blades or teeth will be swung outwardly, and when the rod is moved in the opposite direction the blades or teeth will be drawn inwardly. The inner end of the operating rod is extended at right angles to form a handle 28, which extends beyond the slot 23, and by means of which the rod is readily operated.

Having thus fully described my invention, what I claim as new, and desire to secure by Letters Patent, is:—

1. A portable cross cut saw provided with chain saw mechanism and adapted to be carried by hand and held in any desired position, said cross cut saw comprising in its entirety a chain saw, a substantially oblong stock or frame having the chain saw mounted on it and lying within the lateral planes of the same so as to travel in the kerf, a motor also carried by the stock and located at one end thereof and a projecting handle at said end of the frame.

2. A portable cross cut saw provided with chain saw mechanism and adapted to be carried by hand and held in any desired position, said cross cut saw comprising in its entirety a chain saw, a substantially oblong stock or frame having the chain saw mounted on it and lying within the lateral planes of the same so as to travel in the kerf, a motor also carried by the stock or frame and located at one end thereof, and handles or grips extending beyond and carried by the motor.

3. A portable cross cut saw provided with chain saw mechanism and adapted to be carried by hand and held in any desired position, said cross cut saw comprising in its entirety a chain saw, a substantially oblong stock or frame having the chain saw mounted on it and lying within the lateral planes of the same so as to travel in the kerf, a motor also carried by the stock or frame and located at one end thereof and laterally offset from the plane of the chain saw mechanism, and a projecting handle at said end of the frame.

4. A portable cross cut saw provided with chain saw mechanism and adapted to be carried by hand and held in any desired position, said cross cut saw comprising in its entirety a chain saw, a substantially oblong stock or frame having the chain saw mounted on it and lying within the lateral planes of the same so as to travel in the kerf, a transverse shaft carrying a gear for actuating the chain saw mechanism, a motor mounted on the shaft and at one end of the stock or frame and offset laterally from the plane of the chain saw mechanism, and a projecting handle at said end of the frame.

5. A portable cross cut saw provided with chain mechanism and adapted to be carried by hand and held in any desired position, said cross cut saw mechanism comprising in its entirety a chain saw, a substantially oblong stock or frame having the chain saw mounted on it and lying within the lateral planes of the same so as to travel in the kerf, a sprocket wheel around which the chain saw passes, a transverse shaft mounted in the stock or frame and carrying the sprocket wheel, said shaft being extended at one side of the stock or frame, a motor mounted on the extended end of the said shaft, and a projecting handle at said end of the frame.

6. A portable cross cut saw provided with chain saw mechanism and adapted to be carried by hand and held in any desired position, said cross cut saw comprising in its entirety a chain saw, a substantially oblong stock or frame having the chain saw mounted on it and lying within the lateral planes of the same so as to travel in the kerf, a motor also carried by the stock or frame and located at one end thereof, a guard around the chain saw at one end of the stock or frame and covering the teeth thereof, and handles or grips projecting from said end of the frame.

7. A saw provided with means for engaging the wall of a kerf for holding the saw in the same.

8. A saw provided with means for engaging the wall of a kerf, said means being movable inward and outward.

9. A saw provided in rear of its cutting edge with a tooth or blade movable inward and outward and adapted to engage the wall of a kerf for holding the saw therein, and means for operating the tooth or blade.

10. A saw provided with a hinged tooth or blade movable inward and outward and adapted to engage the wall of a kerf, and operating mechanism connected with the tooth or blade.

11. A saw provided at opposite sides with teeth or blades movable inward and outward for engaging the wall of a kerf, an operating rod, and means carried by the operating rod for moving the blades or teeth inward or outward.

12. A saw provided at opposite sides with hinged blades or teeth movable inward and outward, a rod arranged between the blades or teeth, and links connecting the rods with the blades or teeth.

13. A saw provided with a longitudinal slot, blades or teeth arranged at opposite sides of the saw and movable inward and outward, a longitudinally movable rod located within the slot, means for guiding the rod, and links connecting the rod with the blades or teeth.

In testimony, that I claim the foregoing as my own, I have hereto affixed my signature in the presence of two witnesses.

AUGUST SCHUBERT.

Witnesses:
J. V. BOWEN,
CHAS. F. MOEHRING.